Figure 1:
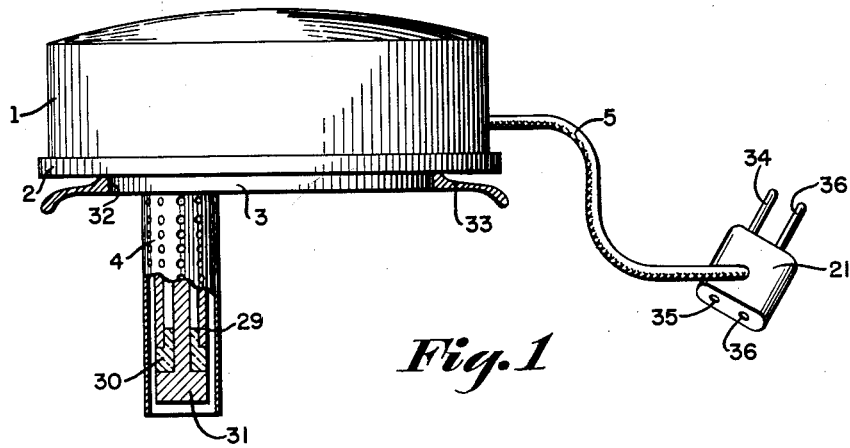

Jan. 30, 1951  R. W. KELLEY  2,539,541
AUTOMATIC CONTROL FOR VACUUM BREWERS
Filed Aug. 19, 1946

Inventor
Robert W. Kelley
By Ben J. Chromy
Attorney

Patented Jan. 30, 1951

2,539,541

UNITED STATES PATENT OFFICE 2,539,541

AUTOMATIC CONTROL FOR VACUUM BREWERS

Robert William Kelley, Hartford, Conn., assignor to Apparatus Development Company, Wethersfield, Conn., a partnership composed of L. F. B. Carini and George E. Stronach Application August 19, 1946, Serial No. 691,637

6 Claims. (Cl. 99—281)

This invention relates to automatic control circuits in general. More particularly this invention relates to an automatic control apparatus for vacuum coffee brewers which enables the user thereof to brew coffee substantially automatically once the apparatus has been set into operation and which will maintain and apply sufficient heat to keep the coffee brew at a desired temperature without further attention until the brew is consumed. An object of this invention is to provide a substantially automatically controlled unit that may be employed with all of the various types of vacuum coffee makers.

Another object of this invention is to provide a control unit for vacuum type coffee makers, said control unit requiring no setting or cocking of levers to place it into operation. A further object of this invention is to provide a control unit adapted for use with vacuum type coffee makers whereby the coffee maker may be left substantially unattended once it is properly filled with coffee and water and the electric current applied to the heater thereof.

Still a further object of this invention is to provide a control unit for vacuum type coffee makers whereby the same heater as is employed for initially making the coffee is also employed for warming the coffee for delayed use.

Another object of this invention is to provide a control unit for vacuum type coffee makers of such construction that the operation thereof is sustained even if the unit is temporarily removed from its normal position on the top bowl of the coffee maker.

Other and further objects of this invention will be apparent to those skilled in the art to which it relates from the following specification, claims and the drawing.

In accordance with this invention there is provided a light weight, simple and inexpensive attachment for vacuum type coffee brewers which may be connected to the electrical circuit of the coffee brewer heating unit through an adapter plug and which will render the operation of the coffee brewer substantially automatic once the apparatus is set into operation. This control consists of a pair of electrodes positioned inside of a perforated or foraminous insulation tubing which project into the top or steeping bowl of the vacuum coffee making apparatus. These electrodes are supported on the bottom of a small casing or housing which is formed to rest over the mouth of the upper bowl of the coffee maker. Inside of this housing is positioned a small relay, the winding of which is adapted to be initially energized through the aforesaid electrodes, these electrodes and relay being connected to the electric current supply through the aforementioned adapter plug. A small thermostatic or bi-metallic element and a low resistance resistor associated therewith are also positioned inside of this housing. These elements are all connected to the adapter plug that is adapted to be readily connected to the plug arrangement associated with the electrical heating unit of the vacuum coffee brewer. After the adapter plug is plugged into the electrical heating unit receptacle the conventional heating unit supply cord is plugged into the aforesaid adapter and this control apparatus is then ready for use after it is positioned on the top bowl of the coffee maker with the electrodes extending into the bowl.

Further features of this invention will be apparent from the following specification which sets forth a practical embodiment thereof.

Figure 2:
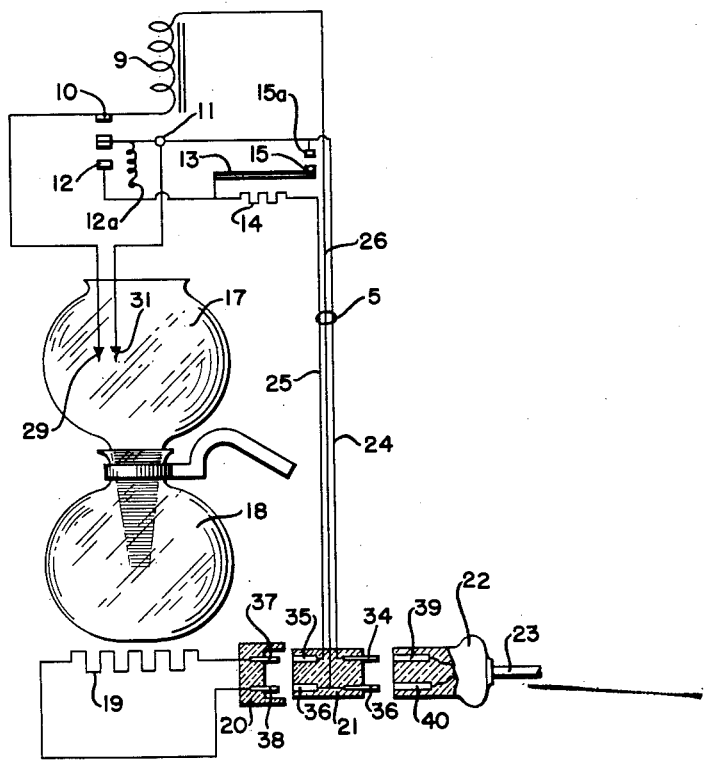

Referring to the drawing briefly, Figure 1 is a side view of the control housing and electrode arrangement adapted to be employed in accordance with the invention; and Figure 2 is a schematic wiring diagram illustrating this control and a schematic representation of the vacuum coffee brewer.

The control elements of this apparatus shown in the top part of Figure 2 above the coffee brewer bowl 17 are all positioned in the inside of the light weight cap 1 which may be made of material such as sheet aluminum and which is illustrated in Figure 1. These electric devices are mounted on the base 2 inside of the cap 1 and electrically insulated therefrom. A lower base 3 is attached to the aforesaid base 2 and the diameter of this lower base is such as to enable it to fit into the top opening of the glass bowl 17 of the coffee brewer. In case it should be desired to employ this apparatus with glass bowls having different size openings suitable adapters 33 shown in Figure 1 may be provided with a hole 32 made to fit around the base 3 so that the housing may be supported properly over the opening of the glass bowl. Both of the bases 2 and 3 may be made of light weight material such as sheet aluminum and these bases may be made integral, for example, the base 3 may be an offset portion formed in the base 2 by suitable punch press or sheet metal forming machinery. Or these bases may be molded out of plastic material such as "Bakelite" or the like. A suitable upstanding flange adapted to hug the lower portion of the housing 1 is provided to the base 2 to facilitate assembly of the housing and the base. The tubular member 4 is provided for the purpose of enclosing the electrodes 29 and 31 in a protective barrier to prevent physical contact with these electrodes by the housewife or other user of this apparatus. This isolation tubular member is preferably of sheet aluminum although other material, such as, glass may be used and is perforated by numerous small holes to permit access to the electrodes 29 and 31 of the coffee brew formed in the top bowl 17 of the coffee maker. The bottom of the tubular member 4 may be open and this will also facilitate access of the liquid to the electrodes and for cleaning purposes.

The electrodes 29 and 31 are insulated from each other by the insulation washer 30 which may also be of material, such as, glass or "Bakelite." The electrodes 29 and 31 and the insulation washer 30 are formed into a unitary structure and the outside surface of this structure is well spaced from the inner surface of the tubular member 4 so that there is no tendency for liquid to be held between these surfaces and furthermore the insulator 30 is of sufficient size so that liquid will not be held arched across this insulator to close the circuit between the electrodes 29 and 31 when the liquid level in the bowl 17 is below the level of insulator 30.

The electrode 29 may be made in the form of a tubular metallic member and inside of this electrode may be positioned a short tubular insulation member of material, such as, glass or "Bakelite" formed as a shoulder on the washer 30 to support the electrode 29 away from the metallic rod shape member extending therethrough. The lower end of the rod shaped member is attached to the electrode 31 and the upper end extends into the housing 1 through suitable insulation bushings. In this way the electrode 29, insulation washer 30 and electrode 31 are supported by this metallic rod-like member inside of the tube 4 and electrical connections may be made between these electrodes and the control apparatus positioned in the housing 1.

It will be observed that the electrode structure and tubular member 4 may be supported at the opposite side of the housing 1 from which the cord 5 is led into this housing for the purpose of providing a balancing action between the electrode structure and the cord 5 so that the housing 1 may be substantially balanced so far as its weight distribution is concerned when it is in position on the top of the bowl 17. The cord 5 consists of the three conductors 24, 25 and 26 which are insulated from each other and the ends of which are connected to the terminals 34, 35 and 36 respectively of the plug adapter 21. Furthermore by offsetting the electrode guard tube 4 to one side of the housing this tube does not interfere with rods or tube extending upward from the bottom bowl 18 into the top bowl 17.

The relay 9 having contacts 10, 11 and 12, the bi-metallic switch 13 and its contacts 15 and 15a and the resistor 14 for heating the bi-metallic member 13 are all positioned inside of the housing 1.

In the schematic wiring diagram the electrode 29 is connected to the contact 10 and one end of the winding of the relay 9. The other end of the winding of this relay is connected through the wire 26 to the contacts 36 of the adapter plug 21. The other electrode 31 is connected to the wire 24 and through this wire to the contactor 34 of the adapter plug 21. Furthermore this electrode 31 is also connected to the contact 15a of the bi- metal element 13 and to the armature 11 of the relay 9. The armature 11 is biased by the spring 12a to normally maintain this armature in contact with the relay contact 12. The contact 12 is connected to the bi-metal element 13 and to one end of the resistor 14. The other end of the resistor 14 is connected by the wire 25 to the terminal 35 of the adapter plug 21. The adapter plug 21 is arranged so that the terminal 35 and one of the contacts 36 may be made to engage the contacts 37 and 38 respectively of the plug receptacle 20 connected to the heating element 19 of the coffee brewer. The plugs 20, 21 and 22 are arranged so that contacts 35 and 34 of the adapter 21 engage contacts 37 and 39 respectively of the receptacle 20 and plug 22 respectively and the contacts 36 of the adapter 21 engage contacts 38 and 40 of the receptacle 20 and plug 22 respectively. The plug 22 is connected to a cord 23 which is employed in connection with a conventional lighting circuit for supplying electric current to the heating unit and to the control apparatus.

When the cord 23 is connected to a suitable power circuit and the adapter 21 is properly associated with the receptacle 20 and the plug 22 electric current is supplied to the heating element 19 through the wire 24, relay armature 11, relay contact 12, resistor 14 and the wire 25. The heat produced in the heating element 19 causes the water in the lower bowl 18 to boil and to be forced into the upper bowl 17 where the hot water engages the electrodes 29 and 31 thereby establishing a circuit between these electrodes. This circuit connects the winding 9 of the relay to the terminals 34 and 36 of the adapter 21 through the wires 24 and 26 thereby causing the relay winding 9 to be energized. The magnetic field set up by the winding 9 overcomes the spring 12a and attracts the armature 11 to engage the contactor 10. The circuit between the armature 11 and the contact 12 is thereby opened and the circuit of the bi-metallic element 13 is brought into use in that this bi-metallic element henceforth together with the resistor 14 control the heating of the heating element 19 for purpose of warming the coffee in the bowl 18. Furthermore the armature 11 of the relay will maintain the winding 9 of this relay energized as long as this armature is in contact with the contactor 10 even though the electrodes 29 and 31 be withdrawn from the bowl 17 since the winding 9 is connected across the power supply by means of the wires 24 and 26 as long as the armature 11 and contactor 10 remain closed. However if the plug 22 is removed from the adapter 21 so that the winding 9 of the relay is deenergized the spring 12a pulls the armature 11 down and opens the contact between the armature and the contactor 10. As long as the plug assembly consisting of the elements 20, 21 and 22 remains together so that the winding 9 of the relay remains energized the housing 1 and the electrodes 29 and 31 may be removed from the top of the bowl 17 and laid beside the coffee maker and this apparatus will continue to periodically warm the coffee in the lower bowl 18. This warming action is controlled by the bi-metallic element 13 and contactors 15—15a and resistor 14 associated therewith. The resistor 14 is a short piece of resistance wire one end of which is welded or otherwise attached to one end of the bi-metallic element 13 and the heat generated in this resistor is transmitted to the bi-metallic element 13 to cause this element to bend and move the contactor end thereof about one-sixteenth of an inch away from the contact 15a.

It will be observed that the heat generated in the resistor 14 and transmitted to the bi-metallic element 13 causes this bi-metallic element to open the circuit between it and the contact 15a. As a result the current through the resistor 14 and heating element 19 is interrupted and after the bi-metallic element is cooled sufficiently so that it closes the circuit between it and the contact 15a the heating cycle for warming the coffee is repeated. As pointed out above the frequency and duration of these warming heating cycles may be adjusted by adjusting the eccentrically pivoted contact 15a.

While I have described an embodiment of this invention in detail it is of course obvious that modifications therein may be made without departing from the spirit and scope thereof and I do not therefore desire to limit this invention to the exact details set forth except as they may be defined in the claims.

What I claim is as follows:

1. An automatic control for vacuum type coffee brewing apparatus comprising the combination of an electric heating element having a connector and a four terminal adapter plug attached thereto, coffee making apparatus of the vacuum type positioned over said heater, said coffee making apparatus consisting of a bottom bowl connected to a top bowl, said top bowl having an opening in the top thereof and a stem extending into the bottom bowl, a housing positioned over the mouth of said top bowl, a pair of electrodes extending from said housing into said top bowl, a relay having a pair of contacts, an armature and a winding positioned in said housing, said relay armature being connected to one of said electrodes and to the first terminal of said adapter plug, one terminal of said relay winding and one of said relay contacts being connected to the other of said electrodes, the other terminal of said relay winding being connected to the third and fourth terminals of the adapter plug, a bi-metallic relay having a bi-metallic strip, a contact attached to said strip, a contact associated with said attached contact and a small heater resistor element, one end of said heater resistor element being connected to said bi-metal strip and to the other relay contact, the other end of said heater resistor element being connected to the second terminal of said adapter plug and said second bi-metallic strip contact being connected to said relay armature.

2. An automatic control for vacuum type coffee brewing apparatus comprising the combination of an electric heating element having a connector and a four terminal adapter plug attached thereto, coffee making apparatus of the vacuum type positioned over said heater, said coffee making apparatus consisting of a bottom bowl connected to a top bowl, said top bowl having an opening in the top thereof and a stem extending into the bottom bowl, circuit making means extending into said top bowl, a relay having a pair of contacts, an armature and a winding positioned in said housing, said relay armature being connected to said circuit making means and to the first terminal of said adapter plug, one terminal of said relay winding and one of said relay contacts also connected to said circuit making means, the other terminal of said relay winding being connected to the third and fourth terminals of the adapter plug, a bi-metallic relay having a bi-metallic strip, a contact attached to said strip, a contact associated with said attached contact and a small heater resistor element, one end of said heater resistor element being connected to said bi-metal strip and to the other relay contact, the other end of said heater resistor element being connected to the second terminal of said adapter plug and said second bi-metallic strip contact being connected to said relay armature.

3. An automatic control for vacuum type coffee brewing apparatus comprising the combination of an electric heating element having a connector and a four terminal adapter plug attached thereto, coffee making apparatus of the vacuum type positioned over said heater, said coffee making apparatus consisting of a bottom bowl connected to a top bowl, said top bowl having an opening in the top thereof and a stem extending into the bottom bowl, a housing positioned over the mouth of said top bowl, circuit making means extending from said housing into said top bowl, a relay having a pair of contacts, an armature and a winding positioned in said housing, said relay armature being connected to said circuit making means and to the first terminal of said adapter plug, one terminal of said relay winding and one of said relay contacts also connected to said circuit making means, the other terminal of said relay winding being connected to the third and fourth terminals of the adapter plug, a bi-metallic relay having a bi-metallic strip, a contact attached to said strip, a contact associated with said attached contact and a small heater resistor element, one end of said heater resistor element being connected to said bi-metal strip and to the other relay contact, the other end of said heater resistor element being connected to the second terminal of said adapter plug and said second bi-metallic strip contact being connected to said relay armature.

4. An automatic control adapted for coffee brewing apparatus of the type consisting of a bottom vessel, a top vessel connected to the bottom vessel and having a stem extending well into the bottom vessel, comprising an electric heater unit; circuit controlling means adapted to be supported on the mouth of the top vessel of the coffee brewing apparatus; a relay connected to said circuit controlling means; said relay having a winding, and a pair of normally closed contacts; said relay winding being adapted to be connected to a source of electric current supply through said circuit controlling means when the water in the bottom vessel is boiled and forced in the upper chamber; a thermal switch having a contact and a thermally responsive element connected across said normally closed contacts of said relay; and connections for connecting said normally closed contacts in series with said electric heater unit; said normally closed contacts being opened upon the energization of said relay whereby said thermal switch is connected in series with said electric heater to control the warming of the coffee brew.

5. An automatic control adapted for coffee brewing apparatus of the type consisting of a bottom vessel, a top vessel connected to the bottom vessel and having a stem extending well into the bottom vessel, comprising an electric heater unit; circuit controlling means adapted to be supported on the mouth of the top vessel of the coffee brewing apparatus; a relay connected to said circuit controlling means; said relay having a winding, and a pair of normally closed contacts; said relay winding being adapted to be connected to a source of electric current supply through said circuit controlling means when the water in the bottom vessel is boiled and forced in the upper chamber; a thermal switch having a contact and a thermally responsive element connected across said normally closed contacts of said relay; connections for connecting said normally closed contacts in series with said electric heater unit; said normally closed contacts being opened upon the energization of said relay whereby said thermal switch is connected in series with said electric heater to control the warming of the coffee brew; an additional pair of contacts for said relay adapted to be closed when said normally closed contacts are opened; and connections for said additional pair of contacts and said relay winding for maintaining said winding energized while said additional contacts are closed.

6. An automatic control adapted for coffee brewing apparatus of the type consisting of a bottom vessel, a top vessel connected to the bottom vessel and having a stem extending well into the bottom vessel, comprising an electric heater unit; circuit controlling means adapted to be supported on the mouth of the top vessel of the coffee brewing apparatus; a relay connected to said circuit controlling means; said relay having a winding, and a pair of normally closed contacts; said relay winding being adapted to be connected to a source of electric current supply through said circuit controlling means when the water in the bottom vessel is boiled and forced in the upper chamber; a thermal switch having a contact and a thermally responsive element connected across said normally closed contacts of said relay; connections for connecting said normally closed contacts in series with said electric heater unit; said normally closed contacts being opened upon the energization of said relay; and a resistor connected in series with said thermal switch and said electric heater unit for heating the thermally responsive element to control the warming of the coffee brew by periodically closing the circuit to said electric heater unit.

ROBERT WILLIAM KELLEY.

REFERENCES CITED

The following references are of record in the file of this patent:

UNITED STATES PATENTS

| Number | Name | Date |
|---|---|---|
| 992,021 | Marzetti | May 9, 1911 |
| 1,923,889 | Sauter | Aug. 22, 1933 |
| 2,150,801 | Keaton | Mar. 14, 1939 |
| 2,158,133 | Lemp | May 16, 1939 |
| 2,167,255 | Warner | July 25, 1939 |
| 2,168,158 | Hall | Aug. 1, 1939 |
| 2,179,936 | Keene | Nov. 14, 1939 |
| 2,287,583 | Weeks | June 23, 1942 |
| 2,292,853 | Wilcox | Aug. 11, 1942 |
| 2,385,694 | Davis | Sept. 25, 1945 |
| 2,463,431 | Ruppe | Mar. 1, 1949 |